United States Patent
Moon et al.

(10) Patent No.: US 12,423,789 B2
(45) Date of Patent: Sep. 23, 2025

(54) APPARATUS FOR IMPROVING IMAGE QUALITY AND METHOD THEREOF

(71) Applicant: GWANGJU INSTITUTE OF SCIENCE AND TECHNOLOGY, Gwangju (KR)

(72) Inventors: Bochang Moon, Gwangju (KR); Jonghee Back, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 331 days.

(21) Appl. No.: 18/082,861

(22) Filed: Dec. 16, 2022

(65) Prior Publication Data
US 2024/0029222 A1 Jan. 25, 2024

(30) Foreign Application Priority Data

Jul. 22, 2022 (KR) .......... 10-2022-0090740
Jul. 25, 2022 (KR) .......... 10-2022-0092050

(51) Int. Cl.
*G06T 5/20* (2006.01)
*G06T 7/00* (2017.01)

(52) U.S. Cl.
CPC .............. *G06T 7/0002* (2013.01); *G06T 5/20* (2013.01); *G06T 2207/20084* (2013.01); *G06T 2207/30168* (2013.01)

(58) Field of Classification Search
CPC ............ G06T 7/0002; G06T 5/20; G06T 2207/20084; G06T 2207/30168

USPC ....................................................... 382/254
See application file for complete search history.

(56) References Cited

PUBLICATIONS

Back, Jonghee, et al. "Self-supervised post-correction for Monte Carlo denoising." ACM SIGGRAPH 2022 Conference Proceedings. 2022. (Year: 2022).*
Back, Jonghee, et al. "Deep combiner for independent and correlated pixel estimates." ACM Trans. Graph. 39.6 (2020): 242-1. (Year: 2020).*
Munkberg, Jacob, and Jon Hasselgren. "Neural denoising with layer embeddings." Computer Graphics Forum. vol. 39. No. 4. 2020. (Year: 2020).*
Bitterli et al, "Nonlinearly Weighted First-order Regression for Denoising Monte Carlo Renderings," Computer Graphics Forum, vol. 35, No. 4, (2016), 11 pages.
Sadeghi et al, "Coherent Path Tracing," Journal of Graphics Tools, GPU, and GameTools, vol. 14, No. 2, (2009), pp. 12.

(Continued)

*Primary Examiner* — Jonathan S Lee
(74) *Attorney, Agent, or Firm* — Hauptman Ham, LLP

(57) ABSTRACT

The present disclosure provides an apparatus for improving image quality including an image rendering module configured to generate a first data buffer and a second data buffer; an artificial neural network module configured to receive and learn the first data buffer and the second data buffer generated from the image rendering module; and a self-supervised loss calculation module that includes a first self-supervised loss function using pixel values of the first corrected image and the independent and correlated images of the second data buffer and a second self-supervised loss function using pixel values of the second corrected image and the independent and correlated images of the first data buffer, and a method for improving image quality.

15 Claims, 5 Drawing Sheets

(56) References Cited

PUBLICATIONS

Hachisuka et al, "Progressive Photon Mapping," ACM Trans Graph, vol. 27, No. 5, article 130, (2008), 8 pages.
Kalantari et al, "A Machine Learning Approach for Filtering Monte Carlo Noise," ACM Trans Graph, vol. 34, No. 4, article 122, (2015), 12 pages.
Bako et al, "Kernel-Predicting Convolutional Networks for Denoising Monte Carlo Renderings," ACM Trans Graph, vol. 36, No. 4, article 97, (2017), 14 pages.
Xu et al, "Adversarial Monte Carlo Denoising with Conditioned Auxiliary Feature Modulation," ACM Trans Graph, vol. 38, No. 6, article 224, (2019), 12 pages.
Yu et al, "Monte Carlo Denoising via Auxiliary Feature Guided Self-Attention," ACM Trans Graph, vol. 40, No. 6, article 273, (2021), 13 pages.

\* cited by examiner

APPARATUS FOR IMPROVING IMAGE QUALITY AND METHOD THEREOF

CROSS-REFERENCE TO RELATED APPLICATION

This application claims priority to Korean Provisional Patent Application No. 10-2022-0090740, filed on Jul. 22, 2022, and Korean Patent Application No. 10-2022-0092050, filed on Jul. 25, 2022, and all the benefits accruing therefrom under U.S.C. § 119, the disclosure of which is incorporated by reference herein in its entirety.

BACKGROUND

1. Field

The present disclosure relates to an image quality improving apparatus and an image quality improving method. The present disclosure relates to an apparatus and method for improving quality of a rendered image upon rendering an image.

2. Description of the Related Art

As a method for generating an image through photorealistic rendering, Monte Carlo path tracing method is widely known. Since Monte Carlo path tracing method uses a statistical method, noise exists in the rendered image. In addition, many samples are required to obtain good quality, which takes a long time. The image provided in this way may be said to be an independent image since there is no inter-pixel correlation in the image.

A method of reducing noise of an independent image has been devised over a long period of time. This method is a method of reducing noise on the assumption that correlation between pixels does not exist. When an image having correlation between pixels is used as an input, some existing error in the image cannot be effectively removed.

The image provided in this way may be said to be a correlated image since there is some correlation between pixels.

Methods for providing a correlated image include a post-processing denoising technique (Non-Patent Documents 1, 4, and 5), a correlated sampling technique (Non-Patent Document 2), and a light transport simulation method introducing some inter-pixel correlation (Non-Patent Document 3).

The correlated image may reduce the noise generated by the independent image but may not prevent method-specific residual noise or systematic errors.

RELATED ART DOCUMENT

Non-Patent Document (Non-Patent Document 0001) Document 1: Bitterli et al, "Nonlinearly Weighted First-order Regression for Denoising Monte Carlo Renderings", Computer Graphics Forum 35, 4 (2016), 107-117

(Non-Patent Document 0002) Document 2: Sadeghi et al, "Coherent path tracing", Journal of Graphics, GPU, and GameTools 14, 2 (2009), 33-43

(Non-Patent Document 0003) Document 3: Hachisuka et al, "Progressive Photon Mapping", ACM Trans Graph 27, 5, Article 130 (2008), 8 pages (Non-Patent Document 0004) Document 4: Kalantari et al, "A Machine Learning Approach for Filtering Monte Carlo Noise", ACM Trans Graph 34, 4, Article 122 (2015), 12 pages (Non-Patent Document 0005) Document 5: Bako et al, "Kernel-Predicting Convolutional Networks for Denoising Monte Carlo Renderings", ACM Trans Graph 36, 4, Article 97 (2017), 14 pages (Non-Patent Document 0006) Document 6: Xu et al, "Adversarial Monte Carlo Denoising with Conditioned Auxiliary Feature Modulation", ACM Trans Graph 38, 6, Article 224 (2019), 12 pages (Non-Patent Document 0007) Document 7: Yu et al, "Monte Carlo Denoising via Auxiliary Feature Guided Self-Attention", ACM Trans Graph 40, 6, Article 273 (2021), 13 pages It is to be understood that this background of the technology section is intended to provide useful background for understanding the technology and as such disclosed herein, the technology background section may include ideas, concepts or recognitions that were not portion of what was known or appreciated by those skilled in the pertinent art prior to a corresponding effective filing date of subject matter disclosed herein.

SUMMARY

In view of the above, the present disclosure provides an apparatus for improving image quality and a method for improving image quality capable of reducing noise of an independent image and an error of a correlated image.

According to embodiments of the present disclosure, an apparatus for improving image quality includes: an image rendering module configured to generate an independent image, a correlated image, and an auxiliary feature into a first data buffer and a second data buffer; an artificial neural network module configured to receive and learn the first data buffer and the second data buffer generated from the image rendering module; a combination module configured to generate a first corrected image of the first data buffer and a second corrected image of the second data buffer that are output from the artificial neural network module; and a self-supervised loss calculation module configured to calculate self-supervised losses of the first data buffer and the second data buffer, including a first self-supervised loss function using pixel values of the first corrected image and the independent and correlated images of the second data buffer and a second self-supervised loss function using pixel values of the second corrected image and the independent and correlated images of the first data buffer.

The image rendering module may generate an auxiliary feature including at least one of normal information, texture information, and visibility information.

The artificial neural network module may calculate parameters used in Equations 4 and 5 for outputting post-corrected images of the first data buffer and the second data buffer.

$$w_i = \begin{cases} \exp\left(-\dfrac{\log_e(1+\|y_c - y_i\|^2)}{(\gamma_c^y)^2 + \varepsilon} - \dfrac{\log_e(1+\|z_c - z_i\|^2)}{(\gamma_c^z)^2 + \varepsilon}\right) \times, & \text{if } i \neq c, \\ \exp\left(-\dfrac{\|\rho_c - \rho_i\|^2}{(\gamma_c^\rho)^2 + \varepsilon} - \dfrac{\|n_c - n_i\|^2}{(\gamma_c^n)^2 + \varepsilon} - \dfrac{(v_c - v_i)^2}{(\gamma_c^v)^2 + \varepsilon}\right)\tau_c, & \text{otherwise} \end{cases} \quad \text{Equation 5}$$

$\gamma_c^y$, $\gamma_c^z$, $\gamma_c^\rho$, $\gamma_c^n$, $\gamma_c^v$ denote bandwidth parameters for an independent and correlated pixel pair (y and z) and the auxiliary feature including albedo ρ, normal n, and visible buffer v at pixel c. $\tau_c$ denotes a center weight for the pixel c.

The combination module outputs a post-corrected image for each buffer by combining the first data buffer and the second data buffer using Equation 4 which is a combination function.

$$g_c(y, z) = \frac{\sum_{i \in \Omega_c} w_i \{y_i + \beta_c^z \circ (z_c - z_i) + \beta_c^\rho \circ (\rho_c - \rho_i) + \beta_c^n \circ (n_c - n_i)\}}{\sum_{i \in \Omega_c} w_i} \quad \text{Equation 4}$$

Symbol $\circ$ denotes a Hadamard product, $\rho_c$ and $n_c$ denote the albedo and normal values of size 3×1 at the pixel c, and $\beta_c^z$, $\beta_c^\rho$, $\beta_c^n$ of size 3×1 denote scale parameters at the pixel c that control a relative importance of $z_c - z_i$, $\rho_c - \rho_i$, and $n_c - n_i$.

The first self-supervised loss function is represented by Equation 10.

$$\mathcal{L}_s^a(\hat{\mu}_c^a) = \frac{\|\hat{\mu}_c^a - y_c^b\|^2}{(\hat{z}_c^b)^2 + 0.01} \quad \text{Equation 10}$$

The artificial neural network module updates a learning parameter θ in the artificial neural network module for generating a post-corrected estimate to minimize the self-supervised loss output from the self-supervised loss calculation module.

According to other embodiments of the present disclosure, a method for improving image quality includes: generating an independent image, a correlated image, and an auxiliary feature into a first data buffer and a second data buffer; calculating parameters for outputting post-corrected images of the first data buffer and the second data buffer; outputting a post-corrected image for each buffer by using the first data buffer and the second data as a combination function; calculating a self-supervised loss using a first self-supervised loss function and a second self-supervised loss function for the post-corrected image; and updating a learning parameter to minimize the first self-supervised loss function and the second self-supervised loss function.

There is an advantage of improving image quality according to the present disclosure.

According to the present disclosure, it is possible to further improve image quality during rendering by faithfully reflecting specific image features.

DETAILED DESCRIPTION

Figure 1:
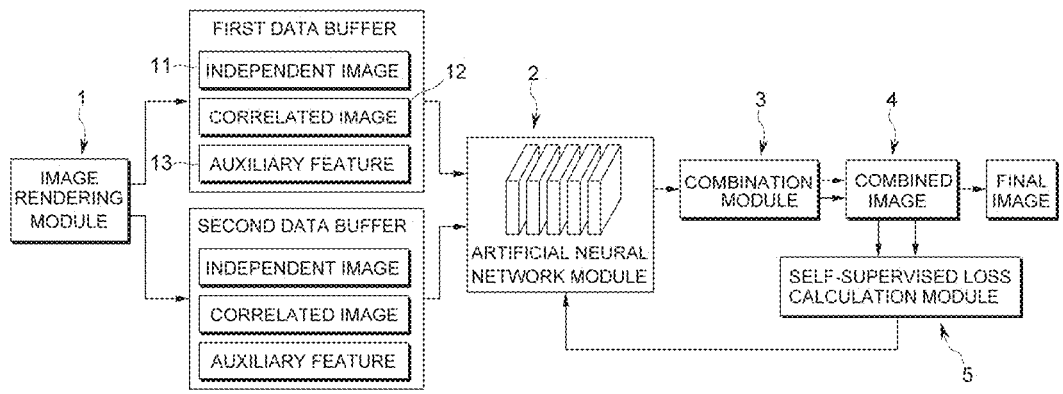
FIG. 1 is a diagram illustrating an apparatus for improving image quality according to an embodiment of the present disclosure.

Hereinafter, embodiments of the present disclosure will be described in detail with reference to the drawings. The spirit of the present disclosure is not limited to the embodiments presented below, and those skilled in the art who understand the spirit of the present disclosure will be able to easily propose other embodiments included within the scope of the same spirit by supplementing, changing, deleting, and adding components, which will also fall within the scope of the spirit of the present disclosure.

Hereinafter, exemplary embodiments of the present disclosure will be described in detail with reference to the accompanying drawings. The same or similar components will be denoted by the same reference numerals independent of the drawing numerals, and an overlapping description for the same or similar components will be omitted. In addition, the terms "module" and "unit" for components used in the following description are used only to easily explain the disclosure. Therefore, these terms do not have meanings or roles that are distinguished from each other. Further, when it is decided that a detailed description for the known art related to the present disclosure may obscure the gist of the present disclosure, the detailed description will be omitted. Further, it should be understood that the accompanying drawings are provided only in order to allow exemplary embodiments of the present disclosure to be easily understood, and the spirit of the present disclosure is not limited by the accompanying drawings, but includes all the modifications, equivalents, and substitutions included in the spirit and the scope of the present disclosure.

Terms including ordinal numbers such as "first," "second," and the like, may be used to describe various components. However, these components are not limited by these terms. The terms are used only to distinguish one component from another component.

It is to be understood that when one component is referred to as being "connected to" or "coupled to" another component, one component may be connected directly to or coupled directly to another component or be connected to or coupled to another component with the other component interposed therebetween. On the other hand, it should be understood that when one element is referred to as being "connected directly to" or "coupled directly to" another element, it may be connected to or coupled to another element without the other element interposed therebetween.

Artificial intelligence (AI) refers to the field of researching artificial intelligence or the methodologies capable of generating the artificial intelligence, and machine learning refers to the field of researching methodologies to define and solve various problems dealt with in the field of artificial intelligence. The machine learning is also defined as an algorithm that improves the performance of a task through continuous experience.

An artificial neural network (ANN) is a model used in machine learning, and may refer to all models having problem-solving ability, which is composed of artificial neurons (nodes) that form a network by coupling synapses. The artificial neural network may be defined by a connection pattern between neurons of different layers, a learning process for updating learning parameters, and an activation function for generating an output value.

The artificial neural network may include an input layer, an output layer, and optionally one or more hidden layers. Each layer includes one or more neurons, and the artificial neural network may include neurons and synapses connecting neurons. In an artificial neural network, each neuron can output a function of an activation function for input signals, weights of each layer, and biases input through synapses.

The learning parameters of the model refer to parameters determined through learning and include weights of synaptic connections and biases of neurons. In addition, the hyper-parameter refers to a parameter that should be set before learning in a machine learning algorithm, and includes a learning rate, an iteration count, a mini-batch size, and an initialization function.

The purpose of learning the artificial neural network may be seen as determining the learning parameters that minimize the loss function. The loss function may be used as an index to determine an optimal learning parameter in the learning process of the artificial neural network.

The machine learning may be classified into supervised learning, unsupervised learning, and reinforcement learning according to the learning method.

The supervised learning refers to a method of learning an artificial neural network in a state in which a label is given for learning data, and the label may refer to a correct answer (or result value) that the artificial neural network should infer when the learning data is input to the artificial neural network. The unsupervised learning may refer to a method of learning an artificial neural network in a state in which a label is not given for learning data. The reinforcement learning may mean a learning method of learning an agent defined in a certain environment to select a sequence of actions or actions that maximize a cumulative reward in each state.

Among the artificial neural networks, machine learning implemented as a deep neural network (DNN) including a plurality of hidden layers is sometimes referred to as deep learning, and the deep learning is a part of the machine learning. Hereinafter, the machine learning is used as a meaning including the deep learning.

The artificial intelligence may be performed by an artificial neural network module (refer to 2 in FIG. 1).

The present disclosure is characterized by using the independent image and the correlated image together to provide an image.

The present disclosure is characterized by combining the independent image and the correlated image to provide an image.

FIG. 1 is a diagram illustrating an apparatus for improving image quality according to an embodiment of the present disclosure.

Referring to FIG. 1, according to an embodiment of the present disclosure, an apparatus for improving image quality includes: an image rendering module configured to generate an independent image, a correlated image, and an auxiliary feature into a first data buffer and a second data buffer; an artificial neural network module configured to receive and learn the first data buffer and the second data buffer generated from the image rendering module; a combination module configured to generate a first corrected image of the first data buffer and a second corrected image of the second data buffer that are output from the artificial neural network module; and a self-supervised loss calculation module configured to calculate self-supervised losses of the first data buffer and the second data buffer, including a first self-supervised loss function using pixel values of the first corrected image and the independent and correlated images of the second data buffer and a second self-supervised loss function using pixel values of the second corrected image and the independent and correlated images of the first data buffer.

An image rendering module 1 generates an independent image 11, a correlated image 12, and an auxiliary feature 13 into a first data buffer and a second data buffer.

The independent image may be an image without correlation between pixels in the image. The correlated image may be an image with some inter-pixel correlation and may be an image to which a denoising technique is applied. Each pixel of the image may include RGB information.

The image rendering module 1 may generate auxiliary feature 13 of each image. The auxiliary feature 13 may include normal information. The normal information may be normal vector information of a surface of an image. In addition, the auxiliary feature 13 may include texture information and/or visibility information. The auxiliary feature 13 may be calculated in advance by the process of providing the independent image 11 and the correlated image 12. The auxiliary feature 13 may be utilized as additional information such as boundary identification of an object in an image. In this way, it is possible to obtain the result with much improved quality.

The image rendering module 1 generates a first data buffer and a second data buffer using two pairs of images including independent pixel estimates $y^a$ and $y^b$ containing some noise and denoised correlated pixel estimates $z^a$ and $z^b$ in independent image 11 and correlated image 12. According to Equations 1 and 2 below, the correlated pixel estimates $z^a$ and $z^b$ may be generated by removing noise from the independent pixel estimates $y^a$ and $y^b$.

As a result, the image rendering module 1 generates a first data buffer $y^a$ and $z^a$ and a second data buffer $y^b$ and $z^b$ independent of each other from the correlated pixel estimates $z^a$ and $z^b$ and the independent pixel estimates $y^a$ and $y^b$. In the same way, the auxiliary feature is also included in the first data buffer and the second data buffer independent of each other. The image rendering module 1 inputs the generated first data buffer and second data buffer to the artificial neural network module 2.

The artificial neural network module 2 receives and learns the first data buffer and the second data buffer. The artificial neural network module 2 may include a convolutional neural network (CNN). In addition, the artificial neural network module 2 may perform deep learning on machine learning implemented as a deep neural network (DNN) including a plurality of hidden layers.

In this embodiment, the CNN of the artificial neural network module 2 may process an input image through a plurality of convolutional layers, a maximum pooling layer, a region-of-interest pooling layer, and/or a fully connected layer. The input image may be iteratively processed through each layer of the CNN and output as a convolutional feature map. The CNN may be a Zeiler and Fergus model, a Simonyan and Zisserman model, or a convolutional neural network model.

As an embodiment of the present invention, the artificial neural network module 2 includes nine layers, and each layer uses a convolution filter with a 3×3 kernel. A final layer of the artificial neural network module 2 uses 15 filters (that is, the number of parameters $\beta_c$, $\gamma_c$, and $\tau_c$) and other layers use 16 filters.

As an activation function of the final layer, a tanh function may be used.

In the final layer, the tanh function for $\beta_c$ and softplus for $\gamma_c$ and $\tau_c$ are used, and ReLU is used in the other layers.

An apparatus for improving image quality using a self-supervised learning framework is implemented using Tensorflow.

The image rendering module 1 extracts 128×128 patches from an input color and an auxiliary feature for training the artificial neural network module 2 within runtime.

The artificial neural network module 2 is trained for 20 epochs using an Adam optimizer.

The artificial neural network module 2 may calculate the parameters $\beta_c$, $\gamma_c$, and $\tau_c$ for correcting the pixel estimate by learning the first data buffer and the second data buffer.

In addition, the artificial neural network module 2 may obtain the optimal parameters $\beta_c$, $\gamma_c$, and $\tau_c$ that may minimize a self-supervised loss.

The combination module 3 may include a combination function. The combination module 3 outputs a post-corrected image having improved quality by the combination function with the parameters $\beta_c$, $\gamma_c$, and $\tau_c$ corresponding to the first data buffer and the second data buffer.

The combination module 3 may use a weight $w_i$ when combining pixels of each image.

Accordingly, the combination module 3 outputs a post-corrected combined image 4 by combining the independent image and the correlated image.

Hereinafter, it will be described in detail that the combination module 3 combines the first data buffer and the second data buffer using the combination function.

A model for predicting a pixel having no correlation with other pixels may be given by Equation 1.

$$y_c = \mu_c + \epsilon_c \qquad \text{Equation 1}$$

Here, y refers to independent pixel estimates, c refers to a target pixel, $\mu$ refers to ground truth, and E refers to error.

Equation 1 above may be a model for an independent image. The method of Equation 1 above may be used for modeling an image provided by a path tracing method.

A model for predicting a pixel having some correlation with other neighboring pixels may be given by Equation 2.

$$z_c - z_i = \mu_c - \mu_i + \epsilon_{ci} \qquad \text{Equation 2}$$

Here, z refers to the correlated pixel estimates, c refers to a target pixel, i refers to a neighboring pixel centered at the target pixel, $\mu$ refers to a ground truth, and $\epsilon_{ci}$ refers to a correlated error of ground truth values at two pixels c and i. Therefore, $z_c - z_i$ may refer to the difference between the correlated pixel estimates at pixel c and pixel i.

The method of Equation 2 may be applied to various methods in which correlation in images exist. The correlated image may be an image from which noise has been removed by a denoising technique.

The combination module 3 may combine the independent image and the correlated image using Equations 1 and 2.

By combining the independent image and the correlated image, the information of the two images can be considered together.

The independent image and the correlated image may be combined by being added with their respective weights $w_i$.

The independent image and the correlated image may be combined by being added and then divided by a common weight.

Equation 3 is a combination function combining Equations 1 and 2 and presents an example of pixel estimate $\hat{\mu}_c = f_c(y,z)$ as a weighted average of the independent pixel estimates $y_i$ and the difference $z_c - z_i$ between the correlated pixel estimates.

$$f_c(y, z) = \frac{1}{\sum_{i \in \Omega_c} w_i} \left\{ \sum_{i \in \Omega_c} w_i y_i + \sum_{i \in \Omega_c} w_i (z_c - z_i) \right\} \qquad \text{Equation 3}$$

Here, $\Omega_c$ denotes a local window including a set of neighboring pixels centered at a target pixel c. $w_i$ denotes a weight of the neighboring pixel i included in the local window $\Omega_c$ centered at the target pixel c.

The weight $w_i$ may be a weight for the sum of independent pixel estimates $y_i$ of any neighboring pixel centered at the target pixel c and a difference $z_c - z_i$ between the correlated pixel estimates at pixel c and pixel i.

In Equations 1 and 2, it is preferable that the errors $\epsilon_c$ and $\epsilon_{ci}$ are smaller. For example, assuming that expected values of the errors $\epsilon_c$ and $\epsilon_{ci}$ are 0, image quality can be improved by finding weights.

Accordingly, an image with improved quality may be obtained by finding a weight that makes the pixel estimate given in Equation 3 smaller.

According to Equation 3, both the independent pixel estimates $y_c$ and $y_i$ at the target pixel c and the adjacent pixel i and the correlated pixel estimates $z_c$ and $z_i$ at the target pixel c and the adjacent pixel i may be utilized. The independent pixel estimate and correlated pixel estimate may be a value included in the independent image and the correlated image.

The combination module 3 generates the pixel estimate as a weighted average of the independent color $y_i$ and the difference $z_c - z_i$ between the correlated colors within a local window $\Omega_c$ centered at the pixel c.

Since a variance of $y_i$ and $z_c - z_i$ may vary locally, the pixel estimate is controlled by the weight $w_i$ that should be adjusted per pixel.

Meanwhile, the combination module 3 may generate the pixel estimate by the combination function defined by Equation 4 using a smaller number of learning parameters, thereby preventing overfitting and reducing training time.

Equation 4 is the expression of Equation 3 again as follows.

$$g_c(y, z) = \qquad \text{Equation 4}$$
$$\frac{\sum_{i \in \Omega_c} w_i \{y_i + \beta_c^z \circ (z_c - z_i) + \beta_c^\rho \circ (\rho_c - \rho_i) + \beta_c^n \circ (n_c - n_i)\}}{\sum_{i \in \Omega_c} w_i}$$

The symbol $\circ$ is the Hadamard product. $\beta_c^z \circ (z_c - z_i) + \beta_c^\rho \circ (\rho_c - \rho_i) + \beta_c^n \circ (n_c - n_i)$ denotes a substitution of $z_c - z_i$ in Equation 3 using albedo and normal buffers $\rho$ and n.

In particular, $\rho_c$ and $n_c$ denote the albedo and normal values of size 3×1 at the pixel c, and $\beta_c^z$, $\beta_c^\rho$, $\beta_c^n$ denote scale parameters at pixel c controlling the relative importance of $z_c-z_i$, $\rho_c-\rho_i$, and $n_c-n_i$.

The artificial neural network module 2 calculates the parameters $\beta_c^z$, $\beta_c^\rho$, $\beta_c^n$ for compensating for approximation errors using rendering information, for example, the albedo and the normal values, and outputs the calculated parameters to the combination module 3.

The weight $w_i$ of Equation 4 is defined as Equation 5 in a cross-bilateral form.

$$w_i = \begin{cases} \exp\left(-\frac{\log_e(1+\|y_c-y_i\|^2)}{(\gamma_c^y)^2+\varepsilon} - \frac{\log_e(1+\|z_c-z_i\|^2)}{(\gamma_c^z)^2+\varepsilon}\right)\times, & \text{if } i \neq c, \\ \exp\left(-\frac{\|\rho_c-\rho_i\|^2}{(\gamma_c^\rho)^2+\varepsilon} - \frac{\|n_c-n_i\|^2}{(\gamma_c^n)^2+\varepsilon} - \frac{(v_c-v_i)^2}{(\gamma_c^v)^2+\varepsilon}\right)\tau_c, & \text{otherwise} \end{cases}$$

Equation 5

$\gamma_c^y$, $\gamma_c^z$, $\gamma_c^\rho$, $\gamma_c^n$, $\gamma_c^v$ denote bandwidth parameters for an independent and correlated pixel pair (y and z) and the auxiliary feature that includes the albedo $\rho$, the normal n, and the visibility buffer v at pixel c. $\tau_c$ denotes the center weight for pixel c. As a result, the combination function $g_c(y,z)$ for the post-correction in Equation 4 requires one set of scale parameters $\beta_c \equiv \{\beta_c^z, \beta_c^\rho, \beta_c^n\}$, bandwidth parameters $\gamma_c \equiv \{\gamma_c^y, \gamma_c^z, \gamma_c^\rho, \gamma_c^n, \gamma_c^v\}$, and a center weight $\tau_c$ at pixel c.

As a result, the artificial neural network module 2 generates a parameter set $\beta_c$, $\gamma_c$, and $\tau_c$ per pixel through the learning parameter $\theta$ in the module.

The combination module 3 outputs a post-corrected image by generating a combined image for each buffer using Equation 4, which is the combination function, for the first data buffer and the second data buffer.

Table 1 shows the post-corrected results to which Equation 4 and Equation 5 is applied or is not applied.

TABLE 1

| Scenes | Denoisers | Setting A | Setting B | Setting C | Setting D |
|---|---|---|---|---|---|
| BATHROOM | KPCN | 0.002903 | *0.001015* | 0.002200 | 0.001003 |
| | AFGSA | 0.002699 | *0.001127* | 0.001842 | 0.000954 |
| HAIR | KPCN | 0.004383 | *0.003899* | 0.004412 | 0.003400 |
| | AFGSA | 0.004185 | *0.004005* | 0.004379 | 0.003659 |
| DRAGON | KPCN | 0.008340 | 0.008314 | *0.008217* | 0.007552 |
| | AFGSA | 0.008223 | 0.007715 | 0.007863 | *0.007783* |
| SANMIGUEL | KPCN | 0.008211 | *0.006973* | 0.008577 | 0.006280 |
| | AFGSA | 0.007512 | *0.006848* | 0.010412 | 0.006721 |

Referring to Table 1, the self-supervised corrected result by the cross-bilateral weights (settings B and D in Table 1) according to Equations 4 and 5 is more accurate than the results without weights (settings A and C in Table 1). The combination function (AFGSA for Dragon) according to the present disclosure having the cross-bilateral weight (setting D) shows better performance than the combination function (setting B) of Equation 3 having the same weighting system except for the case of (AFGSA for Dragon) by the additional use of the auxiliary feature for bias compensation. The best result and the second best result are shown as indicated by bold and italic text.

The conventional apparatus for improving image quality learns in advance the learning parameters in the artificial neural network module 2 that minimizes the loss due to the loss function as in Equation 6.

$$f_r(\hat{\mu}_c) = \frac{\|\hat{\mu}_c - \mu_c\|^2}{\bar{\mu}_c^2 + 0.01}$$

Equation 6

In Equation 6, $\mu_c$ denotes the ground truth value at the pixel c, and $\bar{\mu}_c$ denotes the average value of the ground truth value $\mu_c$.

The loss function as in Equation 6 relies on the ground truth ($\mu_c$) for the independent pixel c.

The apparatus for improving image quality according to the embodiment of the present disclosure may train the artificial neural network module 2 without relying on the ground truth $\mu_c$.

The self-supervised loss calculation module 5 according to the embodiment of the present disclosure includes a first self-supervised loss function and a second self-supervised loss function. The self-supervised loss calculation module 5 calculates the self-supervised loss by using the first self-supervised loss function and the second self-supervised loss function for the post-corrected image output from the combination module 3, thereby enabling the combination module 3 to output an optimal corrected image without performing learning in advance in the neural network module 2.

Accordingly, when the self-supervised loss calculation module 5 calculates the self-supervised loss by the first self-supervised loss function and the second self-supervised loss function, the artificial neural network module 2 can update the learning parameter minimizing the self-supervised loss, and thus, performs the training for each input y and z without the ground truth p within the runtime.

The first self-supervised loss function and the second self-supervised loss function of the self-supervised loss calculation module 5 according to the present disclosure use only the test input without using the actual error value $\|\hat{\mu}_c-\mu_c\|^2$ to predict the expected value of the actual error value $E\|\hat{\mu}_c-\mu_c\|^2$.

Hereinafter, the first self-supervised loss function and the second self-supervised loss function will be described in detail.

The self-supervised loss calculation module 5 receives the independent and correlated images of the first data buffer and the second data buffer output from the image rendering module 1.

In addition, the self-supervised loss calculation module 5 receives the post-corrected pixel estimates $\hat{\mu}_c^a$ and $\hat{\mu}_c^b$ of the first data buffer and the second data buffer output from the combination module 3.

The self-supervised loss optimizing the correction process of the first data buffer may be defined by Equation 7 to be defined.

$$\tilde{f}_c(\hat{\mu}_c^a) = \frac{E\|\hat{\mu}_c^a - \mu_c\|^2}{\bar{\mu}_c^2 + 0.01}$$

Equation 7

The expected value of this self-supervised loss function may be simplified as in Equation 6.

$$E\|\hat{\mu}_c^a-\mu_c\|^2 \approx \|\hat{\mu}_c^a-y_c^b\|^2 - 1^T\hat{\sigma}^2(y_c^b)$$

Equation 8

Here, $\hat{\sigma}^2(y_c^b)$ denotes an unbiased estimate of the variance, i.e., the sample variance of the pixel color $y_c^b$, and 1 denotes a 3×1 vector in which each element is composed of 1.

Accordingly, if Equation 8 is substituted into Equation 7, the self-supervised loss of the first data buffer is expressed by Equation 9.

$$\tilde{\mathcal{L}}(\hat{\mu}_c^a) \approx \frac{\|\hat{\mu}_c^a - y_c^b\|^2 - 1^T \hat{\sigma}^2(y_c^b)}{\overline{\mu}_c^2 + 0.01} \quad \text{Equation 9}$$

Since this self-supervised loss function relies on the average value of the ground truth, which is still the reference value, the unknown value should be predicted.

For this estimation, it is desirable to select values that are statistically independent of the estimate because variance-related items $1^T \hat{\sigma}^2(y_c^b)/(\overline{\mu}_c^2+0.01)$ may be ignored. An intensity $\overline{y}_c^b$ or $\overline{z}_c^b$ of the pixel values of the independent and correlated image of the second data buffer is preferably substituted for the intensity of unknown ground truth. The correlated image generally has lower errors than the independent image.

As a result, when the intensity $\overline{z}_c^b$ of the pixel value of the correlated image is substituted for the unknown value, the first self-supervised loss function for calculating the self-supervised loss for the first data buffer may be expressed by Equation 10.

$$\tilde{\mathcal{L}}(\hat{\mu}_c^a) = \frac{\|\hat{\mu}_c^a - y_c^b\|^2}{(\overline{z}_c^b)^2 + 0.01} \quad \text{Equation 10}$$

As a result, the first self-supervised loss function uses the post-corrected estimate of the first data buffer, the intensity of the correlated image of the second data buffer $\overline{z}_c^b$, and the pixel value of independent image of the second data buffer $y_c^b$.

Also, in the same manner, the second self-supervised loss function for the second data buffer may be defined using the independent pixel value and the correlated pixel value of the first data buffer instead of the unknown estimated value in the same manner.

The self-supervised loss calculation module 5 outputs the self-supervised loss of the first data buffer and the self-supervised loss of the second data buffer calculated by the first self-supervised loss function and the second self-loss function to the artificial neural network 2.

The artificial neural network module 2 optimizes the learning parameter $\theta$ of the artificial neural network module that receives the self-supervised loss output from the self-supervised loss calculation module 5 and generates the post-corrected estimates $\hat{\mu}^a$ and $\hat{\mu}^b$.

The optimal learning parameter $\theta^*$ of the artificial neural network module 2 is defined by Equation 11.

$$\theta^* = \operatorname*{argmin}_{\theta} \frac{1}{3N} \sum_{c=1}^{N} 0.5 \left( \tilde{\mathcal{L}}(\hat{\mu}_c^a) + \tilde{\mathcal{L}}(\hat{\mu}_c^b) \right) \quad \text{Equation 11}$$

Here, N denotes the number of pixels in an input image.

The artificial neural network module 2 may update the learning parameter defined by Equation 11 by minimizing the first self-supervised loss function and the second self-supervised loss function according to Equation 10.

The learning parameter of Equation 11 may make an optimized factor of the denoising filter presented in Non-Patent Document 4. In addition, within the necessary range, the content of non-patent Document 4 shall be included in the present disclosure. Of course, the first self-supervised loss function and the second self-supervised loss function may obtain more accurate information by additionally using the auxiliary feature 13.

Figure 2:
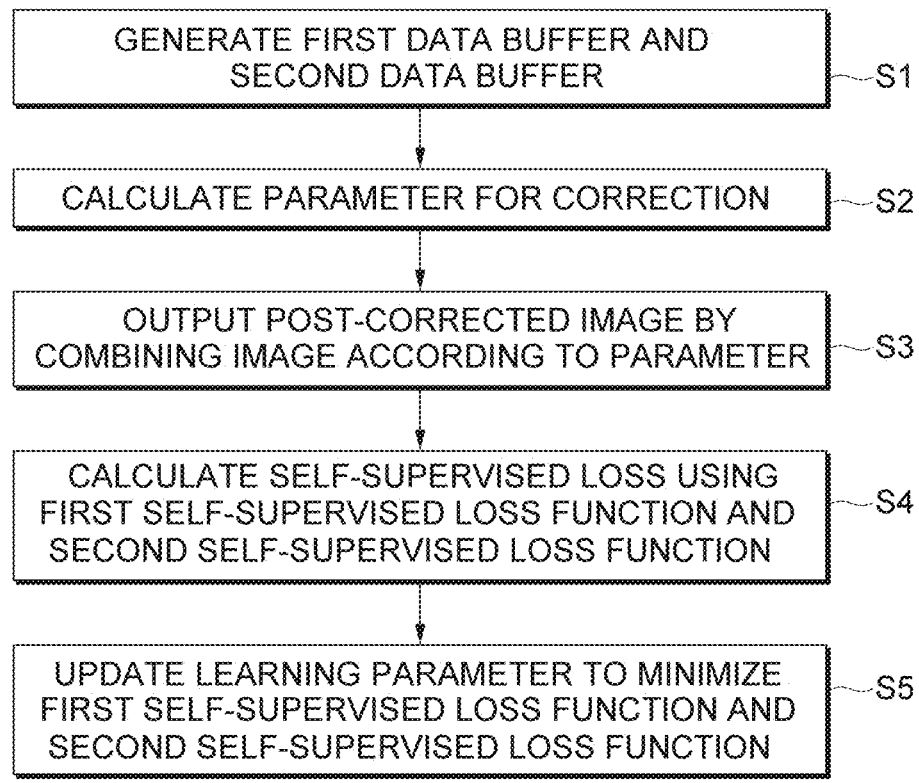
FIG. 2 is a diagram illustrating a method for improving image quality according to an embodiment of the present disclosure.

A method for improving image quality according to an embodiment of the present disclosure will be described as follows. FIG. 2 is a diagram illustrating a method for improving image quality according to an embodiment of the present disclosure.

Referring to FIG. 2, a method for improving image quality according to an embodiment of the present disclosure generates the first data buffer and the second data buffer with the independent image 11, the correlated image 12, and the auxiliary feature 13 (S1).

Next, parameters for correcting pixel estimate are calculated by learning the first data buffer and the second data buffer (S2).

Next, the first data buffer and the second data buffer are combined using Equation 5, which is the cross bilateral weight, and Equation 4, which is the combination function, to generate combined images for each buffer and output a post-corrected final image (S3).

Next, the self-supervised loss is calculated for the post-corrected image by using the first self-supervised loss function and the second self-supervised loss function defined by Equation 10 (S4).

Here, the first self-supervised loss function is calculated using the post-corrected estimate of the first data buffer and the pixel values of the independent and correlated images of the second data buffer.

The second self-supervised loss function is calculated using the post-corrected estimate of the second data buffer and the pixel values of the independent and correlated images of the first data buffer.

Next, the learning parameter defined by Equation 11 is updated to minimize the first self-supervised loss function and the second self-supervised loss function according to Equation 10 (S5).

Referring to FIG. 1, as an embodiment of the present invention, the artificial network module 2 includes nine layers, and each layer uses a convolution filter with a 3×3 kernel.

The final layer of the artificial neural network module 2 uses 15 filters (that is, the number of parameters $\beta_c$, $\gamma_c$, and $\tau_c$) and other layers use 16 filters.

As the activation function of the final layer, the tanh function may be used.

In the final layer, the tanh function for $\beta_c$ and the softplus for $\gamma_c$ and $\tau_c$ are used, and the ReLU is used in the other layers.

The apparatus and method for improving image quality using a self-supervised learning framework are implemented using the Tensorflow.

The image rendering module 1 extracts 128×128 patches from the input color and the auxiliary feature for training the artificial neural network module 2 within runtime.

The artificial neural network module 2 is trained for 20 epochs using the Adam optimizer.

The learning rate is set by the following Equation.

$$0.01 \sqrt{\frac{1}{3N} \sum_{c=1}^{N} 1^T \hat{\sigma}^2(y_c)}$$

Here, $\hat{\sigma}^2(y_c)$ denotes an estimated variance using independent pixel estimates of the first data buffer and the second data buffer (i.e., $\hat{\sigma}^2(y_c) = (y_c^a - y_c^b) \circ (y_c^a - y_c^b)/4$).

A batch size is set to 16 and a Xavier uniform initializer is used. A size $|\Omega_c|$ of the local window size is set to 19×19.

Figure 3:
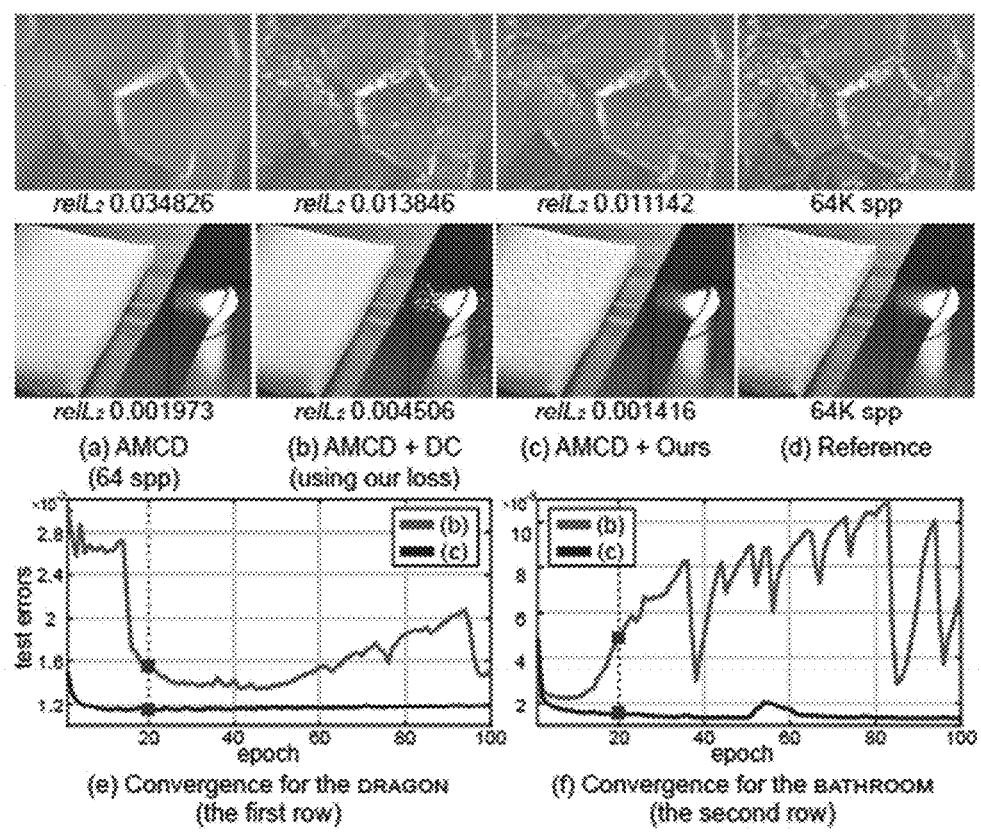
FIG. 3 is a diagram illustrating the effects of the apparatus for improving image quality and the method for improving image quality according to the embodiment of the present disclosure.

FIG. 3 is a diagram illustrating the effects of the apparatus for improving image quality and the method for improving image quality according to the embodiment of the present disclosure.

Referring to FIG. 3, the apparatus for improving image quality and the method for improving image quality according to the embodiment of the present disclosure prevent overfitting to noise and show a more accurate post-correction result.

Figure 4:
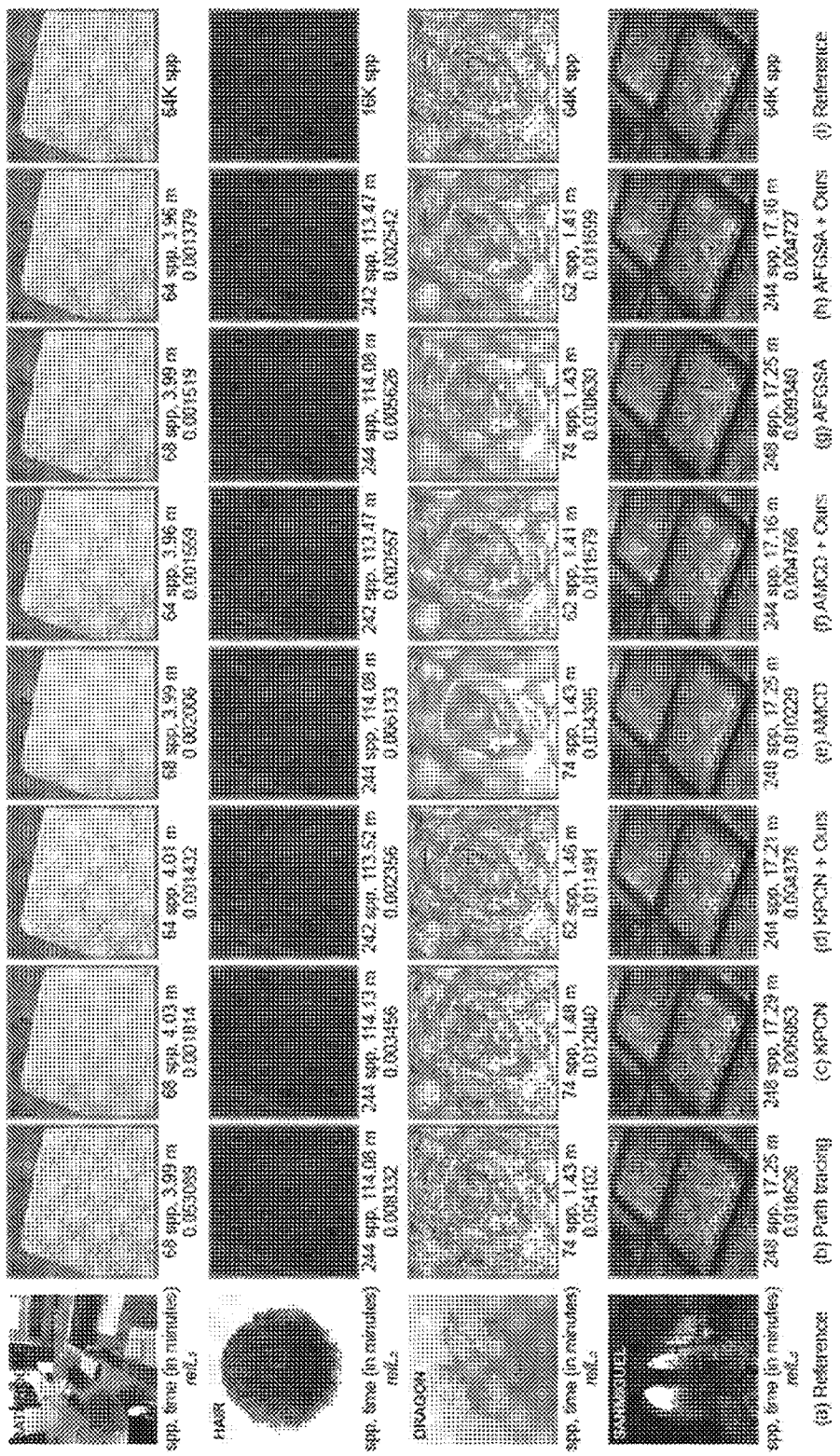
FIG. 4 is a diagram comparing denoised estimates and post-corrected results obtained by applying a self-supervised learning method according to the present disclosure to the denoised estimates.
Figure 5:
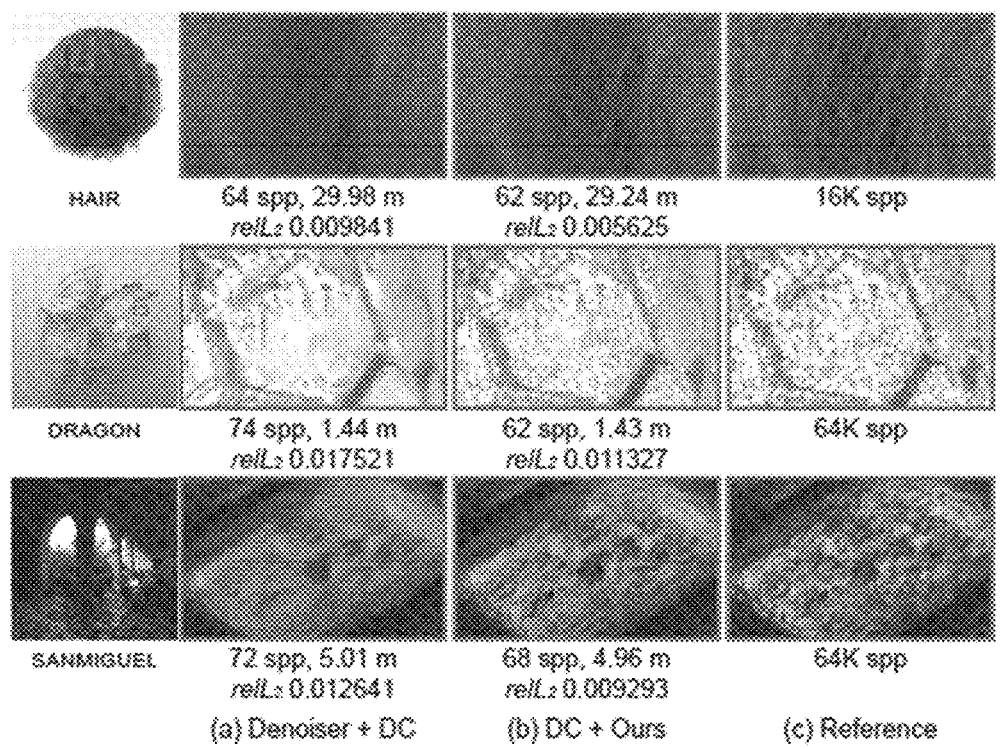
FIG. 5 is a view comparing a result of applying the conventional combination module to a denoising technique (e.g., AFGSA) and post-corrected results obtained by applying the self-supervised learning method according to the present disclosure to a result of applying the conventional combination module.

Referring to FIG. 4, as the apparatus and method for improving image quality according to the embodiment of the present disclosure, state-of-the-art denoising methods such as KPCN [Bako et al. 2017] (Non-Patent Document 5), AMCD [Xu et al. 2019] (Non-Patent Document 6), and AFGSA [Yu et al. 2021] (Non-Patent Document 7) were applied for the post-correction. Referring to FIG. 5, The self-supervised learning method according to the present disclosure was further compared with a deep combiner [Back et al. 2020].

Referring to FIG. 3, it can be seen that FIG. 3(c) which is the method for improving image quality according to the present disclosure is further improved than FIG. 3(a) which is the result of applying AMCD and FIG. 3(b) which is the result of applying the conventional combination module to AMCD.

Also, referring to graphs FIGS. 3(e) and 3(f), despite using smaller learning parameters, FIG. 3(c) which is the method for improving image quality according to the present disclosure shows a stronger and more stable post-correction result for overfitting than FIG. 3(b) which is the result of applying the conventional combination module to AMCD.

FIG. 4 is a diagram comparing denoised estimates and post-corrected results obtained by applying a self-supervised learning method according to the present disclosure to the denoised estimates.

Referring to FIG. 4, the latest denoising methods, KPCN, AMCD, and AFGSA, do not always show good denoising results for all test scenes (see FIGS. 4(c), 4(e), and 4(g)). For example, the KPCN generates relatively high-quality results with details in Dragon and Sanmiguel, but some details in Bathroom and Hair are overly blurred. The AFGSA preserves high-frequency information about the Bathroom, but similarly to AMCD, smooths the detailed information excessively for other scenes.

At the runtime, the test images may often differ from the actual training images, so even with extensive pre-training, a learning-based denoising machine is not ideal for all possible scenarios.

The method for improving image quality according to the present disclosure uses invisible data (i.e., test images) to learn a post-corrected artificial neural network within runtime and improves denoising results, for example in case of excessively blurry artifacts.

FIG. 5 is a view comparing the result of applying the conventional combination module to the denoising technique (e.g., AFGSA) and the post-corrected results obtained by applying the self-supervised learning method according to the present disclosure to the result of applying the conventional combination module.

As illustrated in FIG. 5, the combination module (deep combiner (DC)) for post-correction does not effectively restore the lost high-frequency details (see FIG. 5(a)). Because of the flexibility of the method for improving image quality according to the present disclosure, the method for improving image quality according to the present disclosure may take the post-corrected estimate from the combination module as an input and further correct the result (see FIG. 5(b)). The method for improving image quality according to the present disclosure indicates that various kinds of latest denoising techniques may be supplemented.

Figure 6:
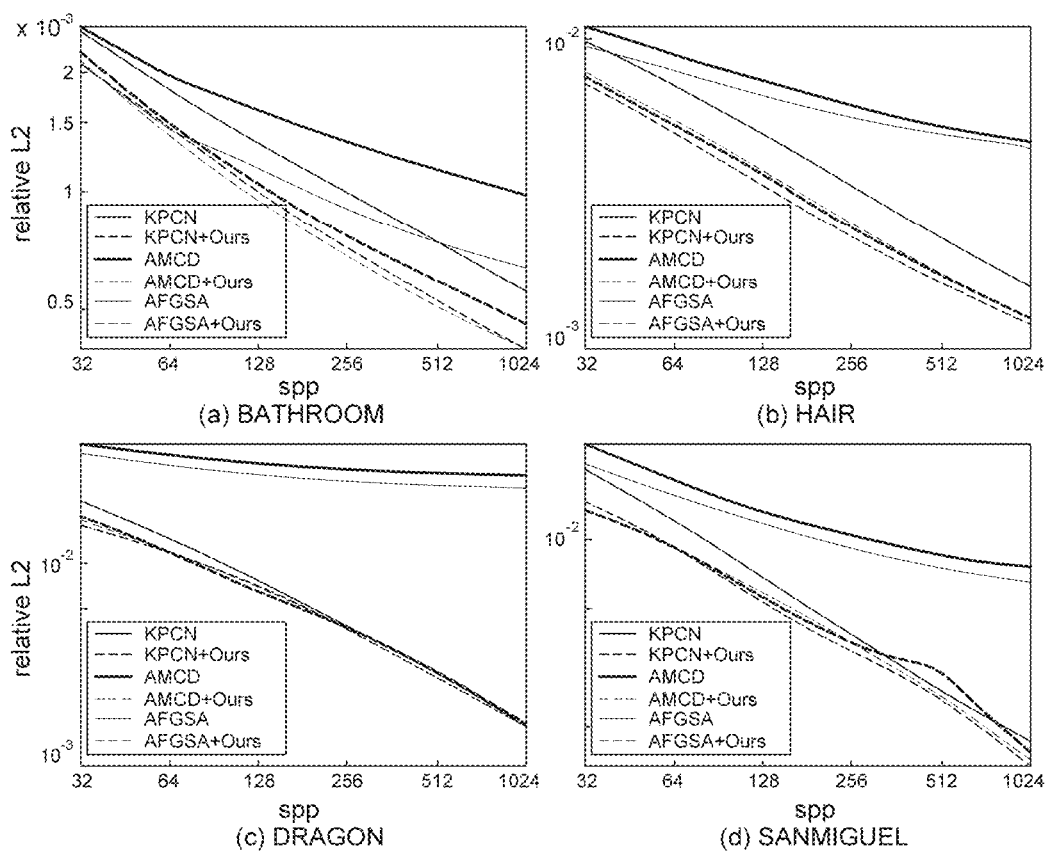
FIG. 6 is a diagram illustrating numerical convergence of denoised estimates and the post-corrected results obtained by applying the method for improving image quality according to the present disclosure to the denoised estimates for various scenes.

FIG. 6 is a diagram illustrating numerical convergence of denoised estimates and the post-corrected results obtained by applying the method for improving image quality according to the present disclosure to the denoised estimates for various scenes.

The method for improving image quality according to the present disclosure helps other denoising techniques to generate numerically more accurate results. For example, the AMCD and the AFGSA do not effectively reduce errors even in the case of increasing the sample size. Referring to FIG. 6, it can be seen that the method for improving image quality according to the present disclosure provides more meaningful results when the present disclosure is applied to two results in a situation with a large number of samples. Technically, since the invented self-supervised loss relies on the independent image (e.g., $y_c^b$ in Equation 10), the loss value may be more accurate in the situation of many samples.

The description of the presented embodiments is provided to allow any person skilled in the art to implement or use the present disclosure. Various modifications to these embodiments will be readily apparent to those skilled in the art, and the generic principles defined herein may be applied to other embodiments without departing from the scope of the present disclosure. Therefore, the present disclosure is not intended to be limited to the embodiments presented herein, but is to be construed in the widest scope consistent with the principles and novel features presented herein.

What is claimed is:

1. An apparatus for improving image quality, comprising:
    an image rendering module configured to generate an independent image, a correlated image, and an auxiliary feature into a first data buffer and a second data buffer;
    an artificial neural network module configured to receive and learn the first data buffer and the second data buffer generated from the image rendering module;
    a combination module configured to generate a first corrected image of the first data buffer and a second corrected image of the second data buffer that are output from the artificial neural network module; and
    a self-supervised loss calculation module configured to calculate self-supervised losses of the first data buffer and the second data buffer, including a first self-supervised loss function using pixel values of the first corrected image and the independent and correlated images of the second data buffer and a second self-supervised loss function using pixel values of the second corrected image and the independent and correlated images of the first data buffer.

2. The apparatus of claim 1, wherein the image rendering module generates an auxiliary feature including at least one of normal information, texture information, and visibility information.

3. The apparatus of claim 2, wherein the artificial neural network module calculates parameters used in Equation 5 for outputting corrected images of the first data buffer and the second data buffer:

$$w_i = \begin{cases} \exp\left(-\frac{\log_e(1+\|y_c-y_i\|^2)}{(\gamma_c^y)^2+\varepsilon} - \frac{\log_e(1+\|z_c-z_i\|^2)}{(\gamma_c^z)^2+\varepsilon}\right)\times, & \text{if } i \neq c, \\ \exp\left(-\frac{\|\rho_c-\rho_i\|^2}{(\gamma_c^\rho)^2+\varepsilon} - \frac{\|n_c-n_i\|^2}{(\gamma_c^n)^2+\varepsilon} - \frac{(v_c-v_i)^2}{(\gamma_c^v)^2+\varepsilon}\right)\tau_c, & \text{otherwise} \end{cases}$$

Equation 5

$\gamma_c^y, \gamma_c^z, \gamma_c^\rho, \gamma_c^n, \gamma_c^v$ denote bandwidth parameters for an independent and correlated pixel pair (y and z) and an auxiliary feature including albedo ρ, normal n, and visible buffer v at pixel c, and $\tau_c$ denotes a center weight for the pixel c.

4. The apparatus of claim 1, wherein the artificial neural network module calculates parameters used in Equation 5 for outputting corrected images of the first data buffer and the second data buffer:

Equation 5

$$w_i = \begin{cases} \exp\left(-\frac{\log_e(1+\|y_c-y_i\|^2)}{(\gamma_c^y)^2+\varepsilon} - \frac{\log_e(1+\|z_c-z_i\|^2)}{(\gamma_c^z)^2+\varepsilon}\right)\times, & \text{if } i \neq c, \\ \exp\left(-\frac{\|\rho_c-\rho_i\|^2}{(\gamma_c^\rho)^2+\varepsilon} - \frac{\|n_c-n_i\|^2}{(\gamma_c^n)^2+\varepsilon} - \frac{(v_c-v_i)^2}{(\gamma_c^v)^2+\varepsilon}\right)\tau_c, & \text{otherwise} \end{cases}$$

Equation 5

$\gamma_c^y, \gamma_c^z, \gamma_c^\rho, \gamma_c^n, \gamma_c^v$ denote bandwidth parameters for an independent and correlated pixel pair (y and z) and an auxiliary feature including albedo p, normal n, and visible buffer v at pixel c, and $\tau_c$ denotes a center weight for the pixel c.

5. The apparatus of claim 1, wherein the combination module outputs a corrected image for each buffer by combining the first data buffer and the second data buffer using Equation 4 which is a combination function:

Equation 4

$$g_c(y,z) = \frac{\sum_{i\in\Omega_c} w_i\{y_i + \beta_c^z \circ (z_c-z_i) + \beta_c^\rho \circ (\rho_c-\rho_i) + \beta_c^n \circ (n_c-n_i)\}}{\sum_{i\in\Omega_c} w_i}$$

Equation 4 symbol ∘ denotes a Hadamard product, $\rho_c$ and $n_c$ denote the albedo and normal values of size 3×1 at the pixel c, and $\beta_c^z, \beta_c^\rho, \beta_c^n$ of size 3×1 denote scale parameters at the pixel c that control a relative importance of $z_c - z_i$, $\rho_c - \rho_i$, and $n_c - n_i$.

6. The apparatus of claim 1, wherein the first self-supervised loss function is represented by Equation 10

$$\mathcal{L}(\hat{\mu}_c^a) = \frac{\|\hat{\mu}_c^a - y_c^b\|^2}{(\hat{z}_c^b)^2 + 0.01}.$$

Equation 10

7. The apparatus of claim 1, wherein the artificial neural network module updates a learning parameter in the artificial neural network module for generating post-corrected estimate to minimize the self-supervised loss output from the self-supervised loss calculation module.

8. The apparatus of claim 7, wherein the optimal learning parameter is defined by Equation 11:

$$\theta^* = \underset{\theta}{\operatorname{argmin}} \frac{1}{3N} \sum_{c=1}^{N} 0.5\left(\hat{\mathcal{L}}(\hat{\mu}_c^a) + \hat{\mathcal{L}}(\hat{\mu}_c^b)\right)$$

Equation 11 where N denotes the number of pixels in an input image.

9. The apparatus of claim 7, wherein the learning parameter is updated to minimize the first self-supervised loss function and the second self-supervised loss function.

10. The apparatus of claim 1, wherein the artificial neural network module includes 9 layers, and each layer includes a convolutional neural network (CNN) using a convolutional filter with a 3×3 kernel.

11. A method for improving image quality, comprising:
generating an independent image, a correlated image, and an auxiliary feature into a first data buffer and a second data buffer;
calculating parameters for outputting corrected images of the first data buffer and the second data buffer;
outputting a corrected image for each buffer by using the first data buffer and the second data as a combination function;
calculating a self-supervised loss using a first self-supervised loss function and a second self-supervised loss function for the corrected image; and
updating a learning parameter to minimize the first self-supervised loss function and the second self-supervised loss function,
wherein the first self-supervised loss function is calculated using pixel values of the corrected image of the first data buffer and the independent and correlated image of the second data buffer, and
wherein the second self-supervised loss function is calculated using pixel values of the corrected image of the second data buffer and the independent and correlated image of the first data buffer.

12. The method of claim 11, wherein a weight is defined by Equation 5:

Equation 5

$$w_i = \begin{cases} \exp\left(-\frac{\log_e(1+\|y_c-y_i\|^2)}{(\gamma_c^y)^2+\varepsilon} - \frac{\log_e(1+\|z_c-z_i\|^2)}{(\gamma_c^z)^2+\varepsilon}\right)\times, & \text{if } i \neq c, \\ \exp\left(-\frac{\|\rho_c-\rho_i\|^2}{(\gamma_c^\rho)^2+\varepsilon} - \frac{\|n_c-n_i\|^2}{(\gamma_c^n)^2+\varepsilon} - \frac{(v_c-v_i)^2}{(\gamma_c^v)^2+\varepsilon}\right)\tau_c, & \text{otherwise} \end{cases}$$

Equation 5

$\gamma_c^y, \gamma_c^z, \gamma_c^\rho, \gamma_c^n, \gamma_c^v$ denote bandwidth parameters for an independent and correlated pixel pair (y and z) and an auxiliary feature including albedo ρ, normal n, and visible buffer v at pixel c, and $\tau_c$ denotes a center weight for the pixel c.

13. The method of claim 11, wherein the combination function is defined by Equation 4:

$$g_c(y,z) = \frac{\sum_{i\in\Omega_c} w_i\{y_i + \beta_c^z \circ (z_c-z_i) + \beta_c^\rho \circ (\rho_c-\rho_i) + \beta_c^n \circ (n_c-n_i)\}}{\sum_{i\in\Omega_c} w_i}$$

Equation 4 symbol ∘ denotes a Hadamard product, $\rho_c$ and $n_c$ denote the albedo and normal values of size 3×1 at the pixel c, and $\beta_c^z$, $\beta_c^\rho$, $\beta_c^n$ of size 3×1 denote scale parameters at the pixel c that control a relative importance of $z_c-z_i$, $\rho_c-\rho_i$, and $n_c-n_i$.

14. The method of claim 11, wherein the optimal learning parameter is defined by Equation 11:

$$\theta^* = \underset{\theta}{\mathrm{argmin}} \frac{1}{3N} \sum_{c=1}^{N} 0.5(\hat{\mathcal{L}}(\hat{\mu}_c^a) + \hat{\mathcal{L}}(\hat{\mu}_c^b)) \qquad \text{Equation 11}$$

where N denotes the number of pixels in an input image.

15. A method for improving image quality, comprising:
generating, by an image rendering module, an independent image, a correlated image, and an auxiliary feature into a first data buffer and a second data buffer;
receiving and learning, by an artificial neural network module, the first data buffer and the second data buffer;
generating, by a combination module, a first corrected image of the first data buffer and a second corrected image of the second data buffer; and
calculating, by a self-supervised loss calculation module, self-supervised losses of the first data buffer and the second data buffer using:
 a first self-supervised loss function using pixel values of the first corrected image and the independent and correlated images of the second data buffer; and
 a second self-supervised loss function using pixel values of the second corrected image and the independent and correlated images of the first data buffer.

\* \* \* \* \*